Oct. 18, 1932.   S. C. SHIPLEY   1,883,015
STEP-BY-STEP PROPORTIONAL CONTROL
Filed Sept. 24, 1931
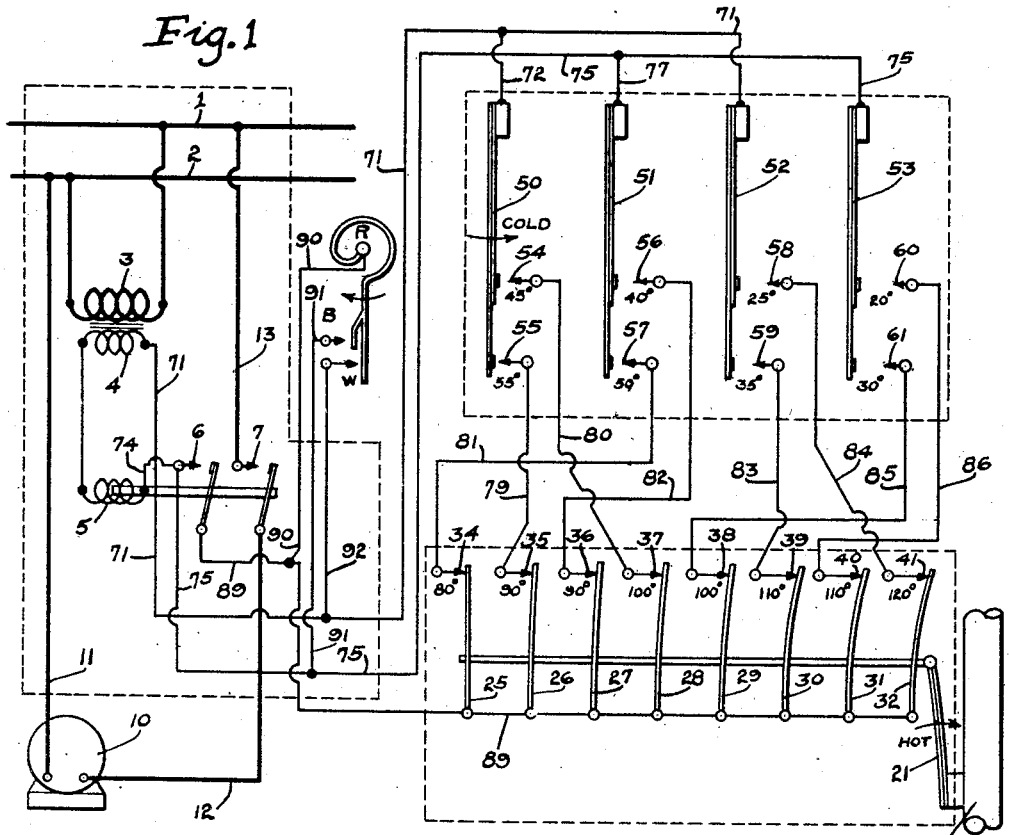
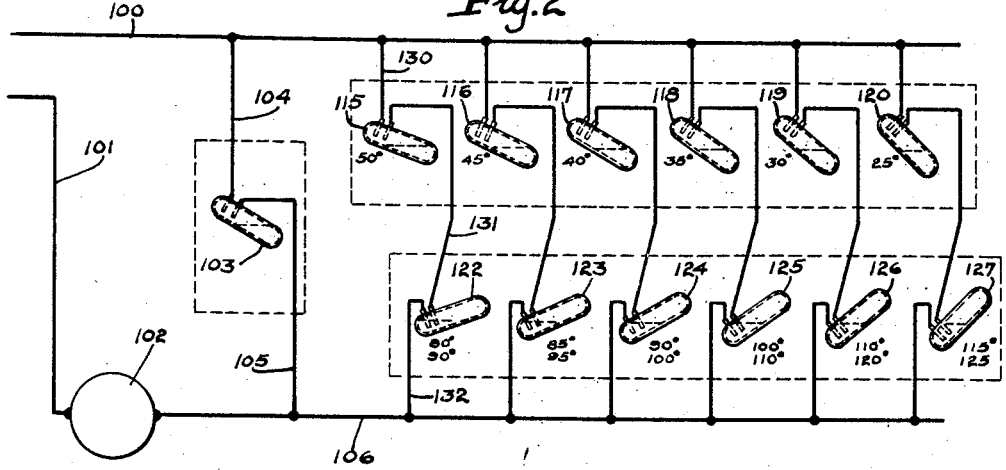
INVENTOR
SYLVANUS C. SHIPLEY
ATTORNEYS Patented Oct. 18, 1932

1,883,015

UNITED STATES PATENT OFFICE

SYLVANUS C. SHIPLEY, OF MINNEAPOLIS, MINNESOTA, ASSIGNOR TO MINNEAPOLIS-HONEYWELL REGULATOR COMPANY, OF MINNEAPOLIS, MINNESOTA, A CORPORATION OF DELAWARE

STEP-BY-STEP PROPORTIONAL CONTROL

Application filed September 24, 1931. Serial No. 564,956.

This invention relates to improvements in control mechanism for heat producing plants, and provides means whereby a heating plant may be controlled to deliver heat in increasingly greater quantities, as the outdoor temperature drops.

Features includes the use of what is known as a "low limit" thermostat having contacts which control starting and holding circuits of the heat generating means, independently of the room thermostat and in conjunction with an outdoor thermostat to proportionately increase heat supply as the outside temperature drops.

Features of the invention include all the circuit arrangements shown, as well as the broader ideas of means inherent in the disclosure.

Objects, features and advantages of the invention will be set forth in the description of the drawing forming a part of this application, and in said drawing Figure 1 is a diagrammatic view showing one embodiment of the invention in which bimetallic thermostatic elements are used to directly control contacts; and Figure 2 is a modification in which mercury tube switches are used.

In thermostatically controlled heating systems, if a room thermostat is in sole command, the radiators will reach excessively high temperature before the air in the room is warm enough to operate the thermostat to stop production of heat. This is partly due to the relatively slow transmission of heat from radiator to room. The radiator continues to deliver this large volume of heat after the thermostat has moved to a position to stop generation of heat at the source, and the room temperature, therefore, rises several degrees above that for which the thermostat is set to interrupt heat supply. Due to inertia of room temperature, the room remains warm while the radiators assume a temperature far below the average temperature required, so that by the time the thermostat closes its contacts to initiate generation of heat, at the source, the heating plant has cooled to such a degree that it cannot be quickly enough brought up to the average temperature required. There results, therefore, too long an interval during which the room is cooling while the heat generator is building up heat in the radiators, and the result is an over-run of temperature below the minimum setting of the thermostat. If the boiler thermostat is set to operate at a temperature not far below the temperature required to heat the building, the time required after a call for heat by the room thermostat, for the radiators to assume the proper temperature is greatly reduced. This reduces temperature overrun on the cold side to a negligible degree. The temperature overruns on the high side, as when no limit control is used, occur principally because the water in the system or the radiators is permitted to assume too high a temperature before the room thermostat is capable of stopping heat production. When the water is not permitted to assume a temperature very far below the average required, it is not necessary that the radiators reach such a high temperature in order to affect the thermostat to stop the supply of heat. The present device is adapted to overcome all of the above mentioned objections.

To understand the advantages of the present device let it be assumed, for example, that the ordinary boiler or low limit thermostatic switch is adjusted to control the heat supply so that the temperature of a radiator in a room may never fall below eighty or ninety degrees. Assume that this setting remains throughout the winter season and that, because of the lowering of outside temperature, the radiator should be maintained at a temperature of one hundred sixty degrees to properly heat the room. However, the low limit device is ineffective to maintain such a temperature, because it permits the radiator temperature to drop to eighty degrees, and, therefore, a cold draft circulation in the room results. It is, therefore, highly desirable, as the outside temperature drops sufficiently to demand an average radiator temperature of one hundred sixty degrees, to provide means whereby the heat supply is so controlled that the radiator temperature cannot fall below say one hundred forty degrees, and so that the heat supply is proportionately increased as the outside temperature falls. The present device provides means whereby as the outdoor temperature drops, heat is supplied in a manner to maintain a radiator temperature which is nearly that of the average radiator temperature required to keep the room at the proper temperature, for example of seventy degrees. In other words, the present device so controls heat supply and radiator temperatures that no matter whether the outdoor temperature is high or low, the heat generator will be operated with such frequency and over such periods of time that radiator temperature will not vary sufficiently to bring discomforture to the occupants of the room or enclosure. Thus the temperature out-put of the radiator is kept sufficiently close to the demand so there are no resultant cold drafts due to air current reversal.

The drawing shows the parts positioned as when the boiler temperature is below eighty degrees (or some predetermined minimum temperature) at which all the switches controlled by this thermostat are closed. The outdoor thermostat contacts are all shown open, as when the outdoor temperature is above fifty-five degrees, or above the maximum temperature at which the controlling action of this instrument is initiated, by closing of its first holding contact, for the control circuit of the heat generating device. The room thermostat contacts are also shown in open position, and, therefore, the heat generator is inoperative.

The hot and ground lines are indicated respectively at 1 and 2. The transformer is connected across main lines and includes the primary coil 3 and secondary coil 4. The burner motor and/or combustion producing and controlling device is indicated at 10 and is connected on one side by conductor 11 with the ground line 2 and on the other side through line 12, contact 7 and line 13 with the hot line 1. It will be understood that the device 10 is symbolic of any suitable means controllable to subserve the needed functions. The means 10 is relay controlled. The coil of the relay is indicated at 5. This relay controls a holding contact 6 and contact 7, closing both simultaneously when the relay is energized. A room thermostat has a switch element R, movable as the result of temperature change and, sequentially cooperating with contacts W and B. A device generally responsive to boiler temperature includes a bimetallic thermal element 21, in this embodiment so located as to be responsive to temperature changes in riser 20. The element 21 moves to the right as the temperature rises and to the left as the temperature falls. This bimetallic element is adapted to operate a series of eight switch elements respectively indicated by numerals 25 to 32, inclusive, and these elements respectively cooperate with contacts indicated by numerals 34 to 41, inclusive.

A series of four thermostats which are responsive to outdoor temperature are respectively indicated by numerals 50 to 53, inclusive. Each thermostat controls two contacts. The thermostat 50 sequentially controls contacts 55—54; thermostat 51 sequentially controls contacts 57—56; thermostat 52 sequentially controls contacts 59—58; and the thermostat 53 sequentially controls contacts 61—60. The elements 25 to 32 are connected by a common conductor 89 with holding contact 6, and holding contact 6 is connected by wire 74, with one side of the relay coil 5. The opposite side of the coil is connected with the corresponding side of the secondary 4 of the transformer. A wire 71 from the opposite side of the secondary connects with thermostat 50 via wire 72 and directly with the thermostat 52. This wire 71 is common to holding contacts 54, 55, 58, 59, 35, 37, 39 and 41. Conductor 75 connects conductor 74 with thermostat 51 via wire 77 and directly with thermostat 53. Wire 75 is common to all starting contacts 56, 57, 60, 61, 34, 36, 38 and 40. Conductor 75 is connected by conductor 91 with contact B of the room thermostat. Conductor 71 is connected by wire 92 with contact W of the room thermostat. Conductor 89 is connected by wire 90 with element R of the room thermostat.

Contact 55 is connected with contact 35 by means of conductor 79. Contact 54 is connected with contact 37 by conductor 80. Contact 57 is connected with contact 34 by conductor 81. Contact 56 is connected with contact 36 by conductor 82. Contact 59 is connected with contact 39 by conductor 83. Contact 58 is connected with contact 41 by conductor 84. Contact 61 is connected with contact 38 by conductor 85. Contact 60 is connected with contact 40 by conductor 86.

The following pairs of contacts are in holding circuits: 35–55, 37–54, 39–59, and 41–58.

The following pairs of contacts are in starting circuits: 57–34, 56–36, 60–40, 61–38.

*Operation*

For convenience and to avoid repetition in the description, the circuits through the outdoor and boiler instrument contacts are traced beginning at the left side of the secondary of the transformer 4, thence to coil 5 of the relay, and thence either through contact 6, or through conductor 75, according as the circuit is for holding or for starting. After tracing the first holding, and the first starting circuit through the boiler and outdoor thermostat contacts, the remaining circuits (which are closed as the result of continued falling outside temperature) are not completely traced but only the contacts are mentioned in that sequence resultant from tracing the circuits from the left hand side of the secondary of the transformer in the manner mentioned.

Assume closure of contact 55, a first holding circuit is conditioned for establishment (after closure of holding contact 6) as follows: 4, 5, 74, 6, 89, 26, 35, 79, 55, 50, 72, 71 to 4. This holding circuit will only be opened when the boiler temperature reaches 90 degrees (opening of contact 35). On further drop of outside temperature to fifty degrees a first starting or energizing circuit for the heat generator or for relay 5 is established as follows: 4, 5, 74, 75, 77, 51, 57, 81, 34, 25, 89, 26, 35, 79, 55, 50, 72, 71 to 4.

Now suppose a continued falling of outdoor temperature to forty-five degrees. A second holding circuit is conditioned for establishment (effective on closure of contact 6) which includes therein contacts 37 and 54 respectively of the boiler and outdoor thermostats. This holding circuit will only be opened when boiler temperature reaches one hundred degrees (opening of contact 37). When the outside temperature reaches forty degrees, a second energizing circuit is established which includes contacts 56, 36, 37 and 54.

When the temperature has dropped to thirty-five degrees, a third holding circuit is conditioned for establishment and includes therein contacts 39 and 59 (opens at 39 at one hundred ten degrees). On drop of the outside temperature to thirty degrees, a third starting circuit is established which includes contacts 61, 38, 39 and 59. When the outside temperature reaches twenty-five degrees, a fourth holding circuit is conditioned for establishment and includes contacts 41, 58 (opens at 41 at one hundred twenty degrees). On continued drop of outside temperature to twenty degrees, a fourth starting circuit is closed and includes contacts 60, 40, 41 and 58.

From the foregoing description of the operation, it is evident that as the outside temperature continues to drop, circuits through the contacts of the outdoor and boiler switches are successively closed, first to condition the corresponding holding circuit for establishment on closure of contact 6, and then to establish the corresponding starting circuit, all to the end that higher and higher boiler temperatures shall be necessary to open the holding contacts of the boiler thermostat to stop generation of heat.

When the boiler temperature is at eighty degrees (which temperature is assumed merely for explanatory purposes) all the starting and holding contacts of the boiler thermostat (or equivalent device motion-responsive to physical changes) and, therefore, the respective circuits controlled by the contacts are conditioned for energization on closure of the corresponding contacts of the outdoor thermostat, to render the room thermostat control ineffective to stop generation of heat as long as the outside temperature remains below the predetermined maximum temperature given as an example.

In case the outdoor temperature is above fifty-five degrees, no circuit is completed through the contacts of the low limit control system. At this time all control is by the room thermostat. When the outdoor temperature drops to fifty-five degrees, a holding circuit is completed through a holding contact on the boiler instrument which contact opens at a temperature of ninety degrees. At this time, it is still necessary that the burner be started, through circuits controlled only by the room thermostat, because at this time, no starting circuit has been completed through any contact of the low limit control system.

In this embodiment of the invention, successive temperature drops of ten degrees are necessary to cause closure of the successive holding and starting contacts. The contacts may, however, be adjusted or designed to open or close on greater or lesser successive temperature rises or drops, in accordance with the requirements.

In Figure 2, there has been shown an embodiment of the invention in which a series of mercury tube switches respectively indicated by numerals 115 to 120 inclusive, are arranged on a common thermostatically controlled support (not shown) and at different angles to one another, so that all will be opened at some predetermined maximum outside temperature, and so that the individual members of the series are successively closed as the outside temperature falls below the maximum temperature for which the instrument is set. A corresponding series of mercury tube switches, the members of which are respectively indicated by numerals 122 to 127 inclusive, are operated by a common thermostatic element (not shown), which element is responsive to boiler or heating plant temperature, and these tubes are so angularly related that all will be closed at some predetermined minimum temperature and will be successively opened as the temperature rises above that minimum, which minimum temperature is higher than that of the maximum temperature at which all outdoor temperature switches are open. Each circuit is in parallel with the burner circuit and includes two of the switches. Numeral 100 indicates one of the main lines. The other main line 101 connects with one side of the burner or with the electrically operable heat generating device 102. The room thermostat is indicated 103 and is of the mercury tube type. The thermal element for operating this switch has not been shown. Conductors 104 and 105 connect the room thermostat across the motor lines 100 and 106 in a manner to energize the burner when the thermostat closes on a call for heat. The opposite side of the burner 102 is connected with line 106. Switches 115–122, are connected across lines 100–106 by conductors 130—131—132, and each of the pairs of switches 116–123, 117–124, 118–125, 119–126, 120–127 are similarly connected by suitable conductors, not referred to by numeral. The closing temperatures of the switches 115 to 120 have been indicated and the closing and opening temperatures of each of the switches 122 to 127 inclusive have also been indicated. It is believed that the operation of this embodiment is clear from the explanation given previously for the other form.

It will be noted that in this embodiment, the maximum outside temperature at which all the outside temperature control switches are open, is lower than the minimum temperature at which all of the boiler temperature controlled switches are closed.

I claim as my invention:

1. A device of the class described including heat generating means, a series of contacts adapted to be sequentially closed as the outside temperature falls, a series of contacts adapted to be sequentially opened as the generating means temperature rises, and electrical connections by which holding and starting circuits for the heat-generating means are alternately made through at least one contact each of said outdoor and generating means responsive devices.

2. A device of the class described including heat generating means, a series of thermostats exposed to outdoor temperature and controlling contacts adapted to be sequentially closed as the outside temperature falls, a series of contacts and means for controlling them in response to the generating means temperature, said contacts adapted to be sequentially opened as the temperature rises, and electrical connections by which holding and starting circuits are alternately made for the heat generating means through at least one contact each of said outdoor and generating-means-responsive devices.

3. A device of the class described including heat generating means, a series of thermostats exposed to outdoor temperature and controlling contacts adapted to be sequentially closed as the outside temperature falls, and to begin closure at some predetermined maximum temperature, a series of contacts and means for controlling them in response to heat generating means temperature, said contacts adapted to be sequentially opened as the temperature rises above a predetermined minimum which is higher than the aforesaid predetermined maximum outside temperature, and electrical connections by which holding and starting circuits are alternately made for the heat generating means through at least one contact each of said outdoor and generating-means-responsive devices.

4. A device of the class described, including an electrically operable heat generating means, means by which the heat is distributed to an enclosure to be heated, a series of thermostats exposed to outside temperature, and controlling contacts, all of which are adapted to be open when the temperature is above a predetermined maximum, and which are adapted to be sequentially closed as the outside temperature falls, a series of contacts and means for controlling them in response to the temperature of the heat-distributing means, all of which contacts are adapted to be closed when said heat-distributing-means temperature reaches a predetermined minimum, and adapted to be sequentially opened as the temperature rises above that minimum, and electrical connections by which holding and starting circuits through the contacts of the outside and inside temperature-responsive devices are alternately made for the heat generating means at temperatures successively greater than the aforementioned minimum temperature.

5. A device of the class described, including an electrically operable heat-generating means, means by which the heat is distributed to an enclosure to be heated, a series of thermostats exposed to outside temperature, each controlling two contacts, all of the contacts of all thermostats being adapted to be open when the outside temperature is above a predetermined maximum, and which are adapted to be sequentially closed as the outside temperature falls, a series of contacts and means for controlling them in response to the temperature of the heat-distributing means, all of which contacts are adapted to be closed when said heat-distributing-means temperature reaches a predetermined minimum, and adapted to be sequentially opened as the temperature rises above that minimum, and electrical connections by which holding and starting circuits are alternately sequentially made for the heat generating means only at temperatures successively greater than the aforementioned minimum temperature.

6. A device of the class described including an electrically operable heat generating means, means by which the heat is distributed to an enclosure to be heated, a series of thermostats exposed to outside temperature, and controlling contacts all of which are adapted to be open when the temperature is above a predetermined maximum, and which are adapted to be sequentially closed as the outside temperature falls, a series of contacts and means for controlling them in response to the temperature of the heat-distributing means, all of which controls are adapted to be closed when said heat-distributing means temperature reaches a predetermined minimum, and adapted to be sequentially opened as the temperature rises above that minimum, and electrical connections by which holding and starting circuits are alternately made for the heat generating means only at temperatures successively greater than the aforementioned minimum temperature, each circuit including therein at least one contact of each of said outdoor temperature-responsive and heat-distributing-means-responsive devices.

7. A device of the class described including electrically operable heat generating means, means by which the heat is distributed to an enclosure to be heated, a thermostat responsive to the temperature of the enclosure, a series of thermostats exposed to the outside temperature and controlling contacts all of which are adapted to be open when the temperature is above a predetermined maximum, and which are adapted to be sequentially closed as the outside temperature falls, a series of contacts and means for controlling them in response to temperature of the heat distributing means, all of which contacts are adapted to be closed when said heat distributing means temperature reaches a predetermined minimum and adapted to be sequentially opened as the temperature rises above that minimum, and electrical connections by which holding and starting circuits for the heat generating means are alternately made through contacts controlled by both the outside temperature and heat-distributing-means, temperature responsive devices and only made at temperatures successively greater than the aforementioned minimum temperature, and adapting the room thermostat to control the heat generating means independently of all other thermostats to start and stop the generating means, except when those switches which are controlled by heat-distributing-means temperature are closed.

In witness whereof, I have hereunto set my hand this 9th day of September, 1931.

SYLVANUS C. SHIPLEY.